Oct. 6, 1942.  W. L. BENEDICT  2,297,866
TREATMENT OF HYDROCARBON OIL
Filed Sept. 25, 1939
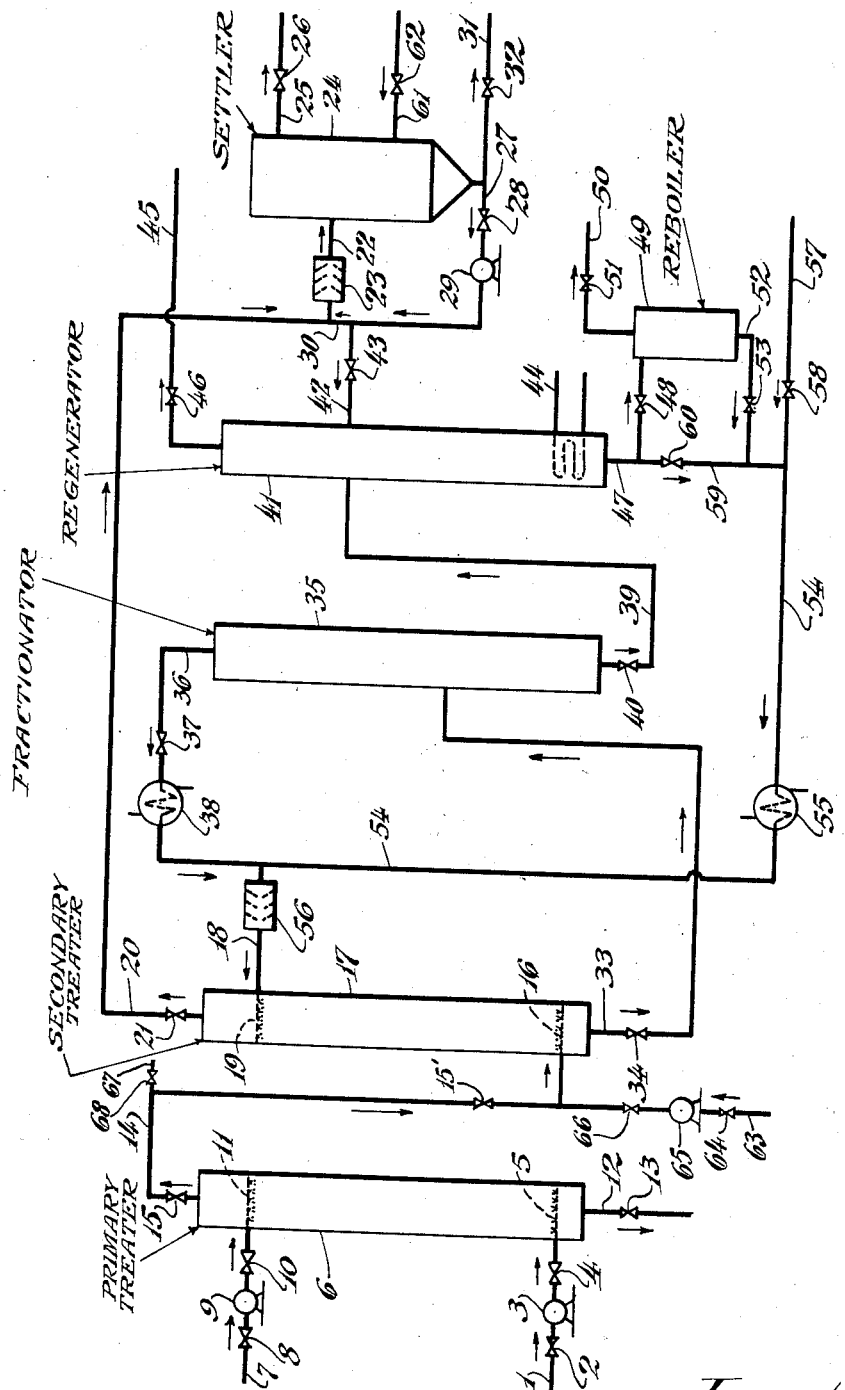
Inventor:
Wayne L. Benedict
By Lee J. Gary
Attorney.

Patented Oct. 6, 1942

2,297,866

UNITED STATES PATENT OFFICE 2,297,866

TREATMENT OF HYDROCARBON OIL

Wayne L. Benedict, Chicago, Ill., assignor to Universal Oil Products Company, Chicago, Ill., a corporation of Delaware Application September 25, 1939, Serial No. 296,416

3 Claims. (Cl. 196—32)

This invention relates to a process for desulfurizing hydrocarbon distillates and especially to a process for removing mercaptan sulfur from gasolines.

More particularly the invention concerns the removal of mercaptans from gasoline by means of both aqueous and alcoholic solutions of alkali metal hydroxides.

Various methods have been practiced for removing sulfur compounds from gasoline, among which are treatment with aqueous caustic solutions, treatment with alcoholic caustic solutions, refining with sulfuric acid, etc. Various sweetening methods have been developed to convert mercaptans into other sulfur compounds of milder odor, such processes including the well-known doctor process, the hypochlorite process, the copper sweetening process, etc. These latter processes, however, have no effect on the sulfur content of gasolines undergoing treatment.

During recent years it has been shown by a number of investigators that mercaptans as well as alkyl di- and poly-sulfides have harmful effects on the antiknock properties of gasoline containing them, particularly in regard to their susceptibility to octane number increases upon the addition of tetraethyl lead. The removal of mercaptans from gasoline has been shown to improve the octane number and susceptibility to tetraethyl lead of the gasoline. Treatment with aqueous sodium hydroxide accomplishes this result to a certain extent, but its application is limited because the complete removal of mercaptans by aqueous caustic solutions is uneconomical and in some cases impossible, since only the lower boiling mercaptans are readily soluble in aqueous caustic solution.

The use of alcoholic solutions of sodium and potassium hydroxide with or without minor quantities of water present and/or various gasoline insoluble organic solvents such as ethylene glycol, diethylene glycol, glycerine, etc. has been suggested as a means of improving the removal of mercaptans.

It is with improvement in these processes that the present invention is concerned.

In one specific embodiment, the present invention comprises contacting gasoline in a primary step with an aqueous solution of an alkali metal hydroxide to remove relatively low boiling mercaptans, separating the gasoline, contacting it in a secondary step with an alcoholic solution of an alkali metal hydroxide, said alcoholic solution comprising a low boiling monohydroxy alcohol, a high boiling polyhydroxy alcohol and/or a minor amount of water, separating the gasoline thus treated and contacting it with water or a mixture of water and polyhydroxy alcohol in a washing step, separating the spent alcoholic caustic solution from said secondary step, removing the monohydroxy alcohol in a distillation step, passing the residual solution to a regeneration step, mixing it with a portion of the water or water and polyhydroxy alcohol solution used in the aforesaid washing step, removing mercaptans from the solution in said regeneration step, recovering the regenerated solution, combining it with the alcohol from the aforesaid fractionation step and returning it to the aforesaid secondary step.

The aqueous caustic solution used in the primary treating step may be of any suitable concentration, for example, 5–50% and preferably approximately 10–15% by weight. Contacting may be carried out in any suitable apparatus, although countercurrent types are the most efficient both for mercaptan removal and efficiency of caustic utilization. The spent caustic withdrawn from this step may be regenerated by heating in the presence of steam according to well-known and widely used methods.

In respect to the alcoholic solution of an alkali metal hydroxide, the invention comprises the use of such a solution in which the solvent consists of a major portion of a monohydroxy alcohol such as methanol, ethanol, propanol, etc., of which methanol is preferred, containing a relatively minor amount of substance which tends to reduce the solubility of the monohydroxy alcohol in hydrocarbons. This substance is preferably an organic substance immiscible with gasoline and includes the polyhydroxy alcohols such as glycerine, ethylene glycol, diethylene glycol, etc., of which glycerine is preferred. The alcoholic caustic solutions may also contain relatively minor amounts of water, although the quantity should not exceed 1–15% and is preferably not more than 10% of the solvent component of the alcoholic solution. The reason for the limited amount of water is that the alkali metal mercaptides formed by reaction with the caustic are hydrolyzed by water and if the quantity of water in the solution is too great, mercaptan removal is incomplete. The monohydroxy alcohol may be used in any proportions but is preferably in the range of approximately 70–30% of the total solvent. The polyhydroxy alcohol may be used in any proportion, but is preferably 30–70% of the total solvent. Contacting of the gasoline with the alcoholic caustic solution may be carried out in any suitable reactor, preferably of countercurrent design.

The present invention has the advantage that it permits more complete removal of mercaptans with relatively reduced amounts of the alcoholic caustic solution which is, of course, considerably more expensive than the aqueous solution. Furthermore, while the alcoholic caustic solution will remove low boiling as well as higher boiling mercaptans, the regeneration of alcoholic caustic solutions in the presence of low boiling mercaptans is complicated by the fact that these compounds boil in or about the region of the monohydroxy alcohol used. At the temperatures of alcohol removal, the mercaptides are partially hydrolized so that the mercaptans distill over with the alcohol and are not readily separated therefrom. Since the success of the process depends on recovery and regeneration of the reagents, as well as on increased mercaptan removal, this is of primary importance. By first removing the low boiling mercaptans with aqueous caustic, which can be done with a high degree of efficiency using aqueous caustic solutions, the only mercaptans appearing in the alcoholic solution in substantial quantities are those of relatively high molecular weight end boiling point, which do not distill over when the alcohol is removed from the alcoholic caustic solution in the step immediately following the secondary treating step and immediately preceding the actual regeneration of the caustic contained in the solution.

Another way of conducting the treatment is to separate the gasoline into lower and higher boiling fractions. The lower boiling fraction is contacted with aqueous caustic solution to remove substantial quantities of the low boiling mercaptans. The boiling range of this fraction may be for example 90–200° F. Mercaptan removal in this step is ordinarily not complete, since the fraction will contain some relatively unreactive mercaptans. The light fraction thus treated with aqueous caustic may be combined with the higher boiling fraction, which may boil for example at 200–400° F. and the mixture may then be contacted with alcoholic caustic solution to effect complete mercaptan removal. The advantage of this procedure is that mercaptan removal from the lower boiling fraction is somewhat more efficient than when contacting the entire distillate with the aqueous caustic.

As a variation, a part or all of the low boiling fraction may be withdrawn from the system and sweetened by other methods. In some instances, the low boiling fraction is practically mercaptan-free after the aqueous caustic wash, so that no further treatment is necessary. In these cases, only the higher boiling fraction is treated with the alcoholic caustic solution.

The gasoline leaving the secondary treating step contains small amounts of dissolved and/or entrained alcoholic caustic solution. This is removed by washing the gasoline with water, a polyhydroxy alcohol, or a solution of polyhydroxy alcohol and water. The alcohol and caustic recovered by this method can be mixed with the caustic solution remaining after separation of the monohydroxy alcohol in the above described distillation step and recovered in the regeneration step. Regeneration is carried out in any suitable type of apparatus such as a vertical tower of the bubble plate type wherein the downwardly flowing solution to be regenerated is contacted with upwardly flowing steam so that the mercaptans released by hydrolysis of the mercaptides are removed by steam distillation. The regenerated caustic solution, which, of course, contains the alkali metal hydroxide and the polyhydroxy alcohol such as glycerine, for example, is withdrawn from the bottom of the reactor and may be heated in a reboiler should it be necessary to remove additional water therefrom to bring the concentration of the solution to the proper point. The solution is then cooled and blended with the alcohol removed in the fractionation step and returned to the secondary treating step.

The gasoline from the washing step may be given further treatment if so desired, such as, for example, an acid treatment whereby the stability, color, sulfur content, etc., of the gasoline are improved. This method of treatment offers some advantage where acid treating is to be carried out, in that the amount of acid used is considerably reduced due to the fact that partial desulfurization has been accomplished prior to acid treatment. The resulting gasoline has been found to be of superior properties when treated in this manner.

Under some circumstances it is not practical or desirable to completely sweeten the gasoline by the method described, and a finishing treatment may be given using, for example, the copper sweetening process or the sodium plumbite sweetening process to produce a doctor sweet product, normally this is not necessary.

The accompanying drawing illustrates diagrammatically one embodiment of the present invention. The apparatus has not been drawn to scale and no attempt has been made to proportionate the various parts. The invention should not be construed as limited to the exact conditions or apparatus shown therein.

Gasoline is pumped through line 1, valve 2, pump 3, valve 4 and spray 5 to primary treater 6, which may be for example a packed tower or a tower containing baffles, bubble trays or other types of contacting members. Aqueous caustic solution is pumped through line 7, valve 8, pump 9, valve 10 and spray 11 into the top of primary treater 6. The downwardly flowing caustic solution encounters the upwardly flowing gasoline and removes low boiling mercaptans therefrom. Methyl, ethyl and propyl mercaptans may be removed substantially completely while butyl and amyl mercaptans and those of higher molecular weight are affected to a lesser degree. The spent caustic solution is withdrawn through line 12 and valve 13. It may be taken to a caustic regeneration system not shown and there regenerated by conventional means. The gasoline substantially free of caustic is passed through line 14, valve 15, valve 15' and spray 16 to secondary treater 17. If necessary a settling step may be interposed to remove entrained caustic from the gasoline. This is not shown, however, in the interest of simplifying the drawing. Alcoholic caustic solution is introduced through line 18 and spray 19, passing downwardly through secondary treater 17 and contacting the upwardly flowing gasoline. The secondary treater may be similar in construction to the primary treater. The treated gasoline is removed through line 20 and valve 21, line 22 and mixer 23 where it is mixed with water from line 30. The mixture of water and gasoline enters settler 24 where the clear gasoline settles out and is removed through line 25 and valve 26. It may be sent to storage or treated by acid or other methods if desired. The water is removed through line 27, valve 28, circulating pump 29, and line 30 which joins with line 20. Additional water may be introduced into the system through line 61 and valve 62. The system may be drained through line 31 and valve 32. The spent alcoholic caustic solution from secondary treater 17 is removed through line 33, valve 34 to fractionator 35. Alcohol is distilled off through line 36 and valve 37, passing through cooler 38. The residual caustic in solution in the gasoline-immiscible portion of the alcoholic caustic solution is withdrawn through line 39 and valve 40 to regenerator 41. A portion of the water from settler 24 which contains caustic and alcohol recovered from the gasoline passes through line 42 and valve 43 from line 27 into regenerator 41 where it mixes with the spent solution from line 39. The regenerator may be any suitable vessel such as a bubble tower or a tower containing perforated pans, baffles, etc., whereby rising steam is contacted with the downwardly flowing caustic solution. Steam may be introduced through coil 44. The tower may be equipped with a closed heating coil to provide additional heat if this is necessary. Steam mixed with mercaptans is removed through line 45 and valve 46. The regenerated caustic solution, which, of course, contains the alkali metal hydroxide and the polyhydroxy alcohol such as glycerine, for example, passes through line 47, valve 48 to reboiler 49 wherein excess water is removed through line 50 and valve 51. Sufficient water is removed to yield a solution of approximately the same caustic concentration as that leaving fractionator 35. The solution passes through line 52 and valve 53 to line 54 and cooler 55. Line 54 joins with line 36 and there the regenerated caustic solution is mixed with alcohol in line 18 and mixer 56. Additional solution may be introduced through line 57 and valve 58. Under certain circumstances a part or all of the solution from regenerator 41 may be passed through line 59 and valve 60, which bypasses reboiler 49.

An alternative operation may be carried out in which the original gasoline is divided into a higher and a lower fraction by means not shown in the accompanying drawing. The lower boiling fraction which may have for example a 200° F. end-point is charged to the primary treater 6 through line 1 and contacted by previously described methods with aqueous caustic solution. If the gasoline is sweet after this treatment, a part or all of it may be withdrawn from the system through line 67 and valve 68. A part or all of the cut may be combined with the higher boiling fraction which enters the system through line 63, valve 64, pump 65 and valve 66, joining with line 14. The mixture passes into secondary treater 17 and is treated in the manner previously described.

The following examples illustrate the usefulness and practicability of the process, but should not be construed as limiting it to the exact conditions, reagents, or apparatus described therein:

*Example 1.*—A West Texas cracked gasoline having a mercaptan sulfur content of 0.09% was contacted with aqueous sodium hydroxide solution, separated and contacted with a solution consisting of 15% of potassium hydroxide dissolved in a solvent made up of 10 parts of water, 30 parts of glycerine and 60 parts of methyl alcohol. The gasoline was separated, water-washed, and found to be sweet to the doctor test. The sulfur content had been reduced from 0.23% to 0.14% by this method of treatment. The octane number had been increased by one number and upon the addition of 3 cc. of tetraethyl lead the octane number was 79 as compared with 77 for the original gasoline when sweetened in the usual way.

The spent solution was regenerated by removal of the methyl alcohol by distillation followed by regeneration of the residual caustic solution in the manner described in the foregoing specifications. After regeneration, the solution was blended with the alcohol recovered and found to be equally efficient as the fresh solution for removing mercaptans.

When omitting the aqueous caustic wash prior to treatment with alcoholic caustic solution, it was found necessary to increase the quantity of alcoholic treating solution by approximately one-third. It was also found that complete removal of mercaptans under these conditions was almost impossible when using regenerated solution, because an appreciable quantity of low boiling mercaptans were distilled out of the caustic solution with the methanol and were returned with the methanol to the treating system.

*Example 2.*—A cracked California gasoline was separated into a fraction boiling at 90–210° F. and another fraction boiling at 210–400° F. The lower boiling fraction was contacted with aqueous caustic soda solution in a primary treating step whereby the mercaptan content was reduced from 0.03% to 0.002%. It was separated from the aqueous caustic solution and combined with the higher boiling fraction after the latter was treated with the alcoholic caustic solution.

The alcoholic solution with which the higher boiling fraction was treated, consisted of 20% sodium hydroxide by weight dissolved in a solvent made up of 6 parts methanol, 3 parts glycerine and 1 part water. The treated gasoline fraction was washed with a minor amount of a solution consisting of 3 parts glycerine and 1 part water in order to recover entrained alcoholic caustic solution. The finished gasoline consisting of the combined lower boiling and higher boiling fractions was sweet and was sent to storage. The solution used in the washing step was combined with the spent alcoholic caustic solution from the secondary treating step, and the solution was regenerated in the manner described in Example 1.

After treating in this manner, an improvement in the octane rating of the finished gasoline of 1 octane number was observed. An improvement of 3 octane numbers over that obtainable with the gasoline sweetened by the doctor process was obtained upon the addition of 3 cc. of tetraethyl lead per gallon. The sulfur content was reduced from 0.27% to 0.19%.

I claim as my invention:

1. In a process for sweetening sour hydrocarbon distillate containing mercaptans wherein said distillate is treated with an alkali metal hydroxide dissolved in a solvent comprising a relatively low boiling alcohol and a higher boiling alcohol and the mercaptan-containing alcoholic solution separated from the treated distillate, the method of regenerating said mercaptan-containing alcoholic solution which comprises vaporizing the lower boiling alcohol from said solution, then vaporizing the mercaptans from the remainder of the solution to leave a residue containing the higher boiling alcohol and alkali metal hydroxide, combining said residue with the lower boiling alcohol from the first-mentioned vaporizing step, and supplying the resultant mixture to the distillate treating step.

2. The method of claim 1 further characterized in that the mercaptans in the remaining solution are vaporized in the presence of steam.

3. The process of claim 1 further characterized in that said higher boiling alcohol and the low boiling alcohol are, respectively, glycerine and methyl alcohol.

WAYNE L. BENEDICT.